(12) United States Patent
Stephenson et al.

(10) Patent No.: US 7,852,759 B2
(45) Date of Patent: Dec. 14, 2010

(54) FINITE STATE MACHINE OF TRAFFIC STREAM METRICS FOR ADAPTATION OF LOAD-BASED CALL ADMISSION CONTROL IN WIRELESS NETWORKS

(75) Inventors: David S. Stephenson, San Jose, CA (US); Lu Qian, Solon, OH (US); Bretton Lee Douglas, San Jose, CA (US); James S. An, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 750 days.

(21) Appl. No.: 11/671,166

(22) Filed: Feb. 5, 2007

(65) Prior Publication Data

US 2008/0186846 A1 Aug. 7, 2008

(51) Int. Cl.
*G06F 11/00* (2006.01)
*H04L 12/26* (2006.01)
*H04J 3/16* (2006.01)
(52) U.S. Cl. ..................... 370/230; 370/252; 370/465
(58) Field of Classification Search ................. 370/229, 370/230, 235, 310, 310.2, 328, 338, 465, 370/252
See application file for complete search history.

(56) References Cited

U.S. PATENT DOCUMENTS

| | | | |
|---|---|---|---|
| 5,497,504 A * | 3/1996 | Acampora et al. .......... 455/436 |
| 5,884,174 A | 3/1999 | Nagarajan et al. | |
| 6,459,681 B1 * | 10/2002 | Oliva ........................ 370/232 |
| 6,625,155 B1 * | 9/2003 | Dziong ................... 370/395.2 |
| 6,647,265 B1 * | 11/2003 | Olofsson et al. ............ 455/445 |
| 6,791,941 B1 * | 9/2004 | Dziong et al. ................ 370/229 |
| 6,944,125 B1 * | 9/2005 | Salmanian ................... 370/232 |
| 6,975,609 B1 * | 12/2005 | Khaleghi et al. ............ 370/335 |
| 7,023,798 B2 * | 4/2006 | Bourlas et al. .............. 370/230 |
| 7,088,677 B1 * | 8/2006 | Burst, Jr. .................... 370/229 |
| 7,120,115 B1 * | 10/2006 | Laaksonen .................. 370/230 |
| 7,242,667 B2 * | 7/2007 | Choi et al. ................... 370/232 |
| 7,292,863 B2 * | 11/2007 | Chen et al. ............... 455/452.2 |
| 7,295,514 B2 * | 11/2007 | Cha et al. .................... 370/230 |
| 7,388,832 B2 * | 6/2008 | Nagato et al. ................ 370/230 |
| 7,512,068 B1 * | 3/2009 | Ghaderi Dehkordi et al. .......................... 370/230 |
| 7,602,761 B2 * | 10/2009 | Lin et al. ..................... 370/347 |
| 7,760,683 B2 * | 7/2010 | Ishii et al. ................... 370/328 |
| 2002/0110106 A1 * | 8/2002 | Koo et al. .................... 370/341 |
| 2003/0129988 A1 * | 7/2003 | Lee et al. ..................... 455/450 |
| 2005/0038903 A1 * | 2/2005 | Venemans ................... 709/234 |
| 2005/0083842 A1 * | 4/2005 | Yang et al. .................. 370/230 |
| 2006/0007913 A1 * | 1/2006 | Botkin et al. ................ 370/352 |
| 2006/0171314 A1 | 8/2006 | Qian | |
| 2008/0117816 A1 * | 5/2008 | Stone et al. .............. 370/230.1 |
| 2008/0159136 A1 * | 7/2008 | Mallesan ..................... 370/230 |

OTHER PUBLICATIONS

U.S. Appl. No. 11/505,785, filed Aug. 26, 2006, Qian, et al.

* cited by examiner

*Primary Examiner*—Warner Wong
(74) *Attorney, Agent, or Firm*—Baker Botts L.L.P.

(57) ABSTRACT

In one embodiment, a method includes receiving a call admission request; in a first state, applying a first call access control (CAC) algorithm to the call admission request; in a second state, applying a second CAC algorithm to the call admission request; and transition between the first state and the second state based on at least one attribute of a radio frequency (RP) environment.

30 Claims, 6 Drawing Sheets

FINITE STATE MACHINE OF TRAFFIC STREAM METRICS FOR ADAPTATION OF LOAD-BASED CALL ADMISSION CONTROL IN WIRELESS NETWORKS

TECHNICAL FIELD

This disclosure relates generally to wireless packet data networks.

BACKGROUND

In recent years wireless networks have gained popularity and have been widely deployed. With fast deployment of wireless local area networks (WLANs), the ability of WLANs to support real time services while maintaining quality of service (QoS) requirements has become an important issue. In order to support a wide range of traffic on a wireless network, the infrastructure should be capable of supporting various quality of service (QoS) requirements, including call admission. Call admission control (CAC) plays a significant role in providing the desired quality of sendee in wireless networks. CAC limits the number of call connections into the network in order to reduce network congestion and call dropping. CAC operates to maximize the use of available bandwidth, either in calls accepted or traffic scheduled according to channel utilization, while minimizing a blocking probability for new calls and call drop probability for connected calls. Admission of even one more call than the call capacity can bring the WLAN from stable to unstable, causing a significant degradation of the voice quality of admitted calls. CAC should therefore be in place to ensure the quality of sendee. Many CAC schemes use metrics such as delay, jitter, and packet loss rate. However, these metrics do not provide an optimal call admission decision. Furthermore, CAC schemes often make the implementation complex and lead to performance degradation.

DESCRIPTION OF EXAMPLE EMBODIMENTS

A. Overview

Particular embodiments of the present invention are directed to call admission control (CAC) in a wireless network. According to one embodiment, the wireless network infrastructure utilizes a CAC finite state machine that maintains the quality of sendee (QoS) needed by users for various network applications. In one embodiment, the finite state machine has at least two states: a normal state, and a heavily utilized state. In one embodiment, the finite state machine may switch between the two states depending on whether the channel is experiencing light or heavy usage, and may utilize CAC metrics to make this determination and to determine whether to make a state transition. The CAC decisions differ between the two states. In one implementation, such CAC metrics may include packet latency, packet loss rate, and usage thresholds. In one implementation, policies may be implemented to determine whether and how to adjust call admission decisions. For example, in one implementation, if the channel is in the normal state, a CAC algorithm may admit both new calls and roaming-in calls. In one implementation, if the channel is in the heavily utilized state, the CAC algorithm may not admit any new calls but may admit a roaming-in call if the criteria associated with ail or a predefined set of the packet latency, packet loss rate, and usage thresholds are met.

B. Example Wireless Network System Architecture

Figure 1:
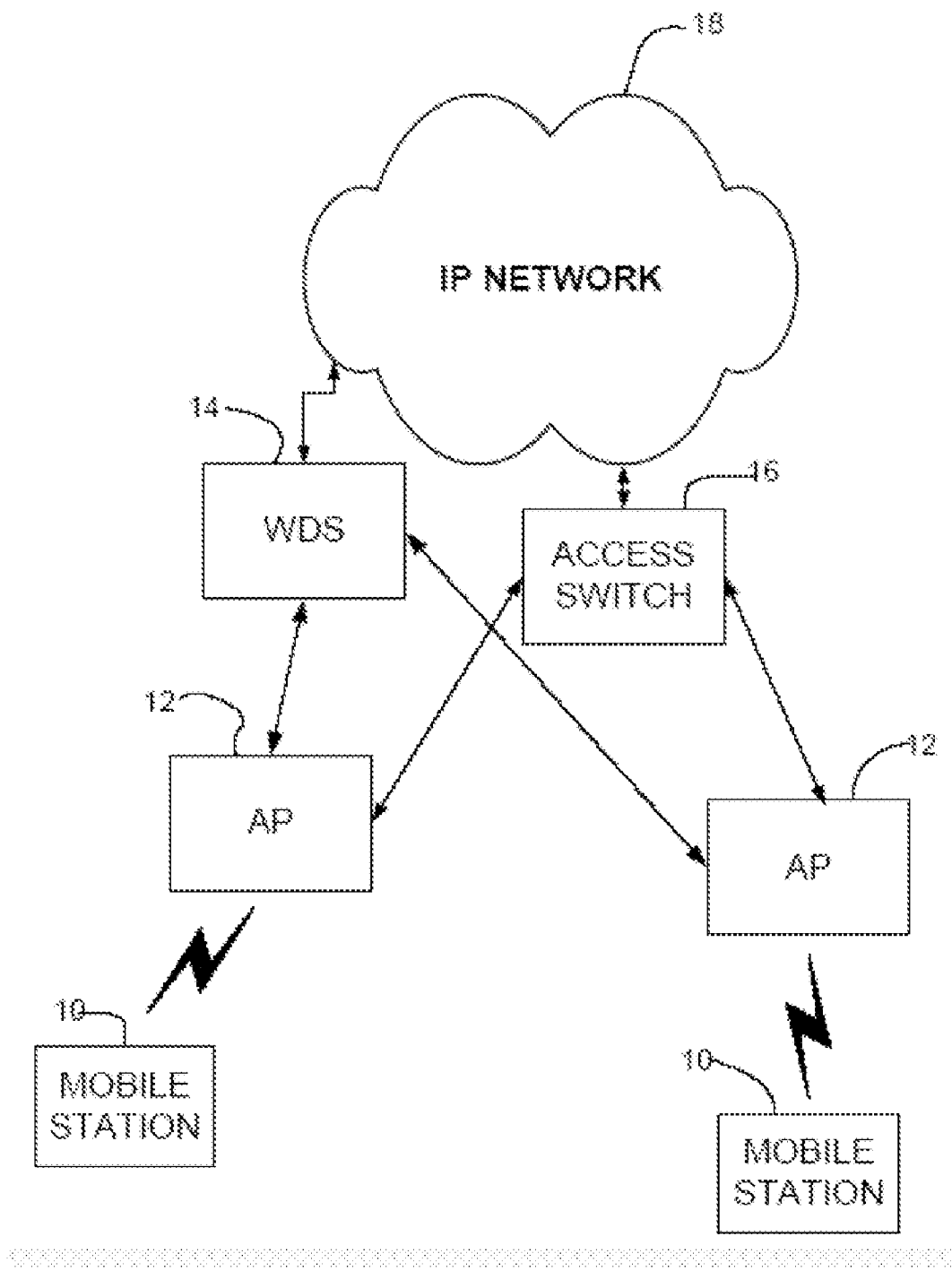
FIG. 1 illustrates an example wireless communication system.

FIG. 1 illustrates an example wireless communication system. The wireless communication system facilitates two-way communication between a plurality of subscriber units (fixed and portable mobile stations) 10 and a fixed network infrastructure 18. Mobile stations 10 may be cellular telephones, personal communication systems such as personal digital assistants (PDAs), laptop computers, pagers, or other suitable wireless devices providing voice, video, data, and other wireless sendees to users. As shown in FIG. 1, the network includes one or more access points (APs) 12, one or more wireless domain services (WDSs) 14, one or more access switches (AS) 16, and multiple subscriber units (mobile stations) 10. The mobile stations 10 are in communication with the APs 12 and may also be in communication with one or more satellites to enable communication with one or more devices coupled to the IP network 18 or any other network. The mobile station 10 may also communicate directly with other devices, such as other mobile stations using suitable wireless communication techniques. Each access point 12 is in communication with WDS 14 and access switch 16. Multiple access points 12 may report to one WDS 14. The access points 12 are coupled to the IP network 18 and allow mobile stations 10 to communicate with other devices coupled to the WLAN. The WLAN may include, for example, access routers, core routers, and other network elements, as is well known by those skilled in the art. The network may include any number of subnetworks and routers, and the subnetworks can form a network topology other than LAN, such as a wide area network, an enterprise network, and a metropolitan area network, for example.

It is to be understood that the network shown and described herein is only one example and that the present invention may be implemented in any telecommunication network utilizing call admission control policies. For example, the method and system described herein may be used with packet data other than IEEE standard 802.11.

In order to provide sufficient quality of sendee for voice packets, a certain amount of voice bandwidth may be serviced, or admitted by the AP 12. If the amount of voice traffic is increased beyond this limit, the QoS of all calls would suffer. The method and system described herein utilize a CAC quality metric for QoS traffic that provides information sufficient to make call admission control decisions. These metrics are preferably made available to the access points 12 in relatively frequent intervals (e.g., 5 second intervals).

The call admission control function allocates bandwidth to client devices on a first-come, first-serve basis, and may also be used to maintain a small reserve so mobile phone clients can roam into a BSS (basic service set) (even though the BSS would otherwise be at full capacity). The CAC metrics may also be used to reserve a specified amount of bandwidth for voice or data. For example, fifty percent of a channel capacity may be reserved for voice and fifty percent reserved for data. The system may also be configured to set a priority to voice or data or used in real time video conferencing to prioritize critical data. The CAC metrics may also be used for load balancing at the WDS based on data received from the APs. A user interface (UI) may be provided to configure channel reservation for roaming or load balancing. The user interface may also display the number of admitted calls, number of additional admissible calls, or other metrics.

The metrics set forth below for use in making a CAC decision are dynamic since the call capacity for a network varies with the network conditions and configurations. The CAC metrics are configured to adjust to changes in wireless medium conditions and network traffic conditions and account for local channel conditions such as foreign interference (e.g., from microwave radios, Bluetooth radios, etc.) that may only affect one or two APs 12 and not the entire WLAN. The CAC metrics described herein are used to predict the impact of a new call on the WLAN before the system admits the call to reduce the chances of a new call causing the WLAN to become unstable.

In one implementation, the CAC metric is based on two requirements (conditions) for a stable WLAN involving the presence of voice clients; channel bandwidth and voice packet queuing, as described in detail below.

The channel bandwidth requirement ensures that there is enough channel bandwidth for voice packets. If a number (N) of calls have already been admitted in a basic sendee set (BSS), the available network bandwidth for additional admissible calls within a voice packet time interval (dT) is represented by:

$$dT*(1-Pb);$$
where:
  dT: voice packet interval; and
  Pb: % of channel busy time from an AP's perspective.

The voice packet interval dT is determined by a Codec in the voice clients and may be, for example, 20 ms. Pb is the percentage of time that the receiver is busy demodulating IEEE standard 802.11 traffic and includes the time the AP 12 transmits packets and the time the AP's clear channel assessment (CCA) reports that a channel is busy. If the WLAN can accommodate a number of additional calls (Na), the additional calls will take a network bandwidth of:

$$(Tl\_u+Tl\_d)*Na; \text{ and}$$
$$(Tl\_u+Tl\_d)*Na \leq dT*(1-Pb)$$
where:
  Na: number of additional admissible calls;
  Tl_u: average transmission time for voice packets in an uplink;
  Tl_d: average transmission time for voice packets in a downlink; and
  Pb: % of channel busy time from an AP's perspective.

Tl_u and Tl_d are the transmission time for voice packets starting when they reach the front end of their transmission queues to the time they receive an acknowledgement for the uplink and downlink respectively, measured and averaged over a sliding time window. Tl_d is measured by the AP itself and Tl_u is measured and reported to the AP by each voice client. The AP further averages Tl_u over the number of voice clients. The retransmission of packets and the time in back-off are counted in the transmission time. When N=0, a predefined value may be used to estimate Tl_u and Tl_d since there are no AP or client measurements of TL_d and Tl_u respectively as measurements are only made where a voice call is present.

The Na equations set forth above can be represented as:

$$Na \leq Na1;$$
where:
  $Na1 = dT*(1-Pb)/(Tl\_u+Tl\_d).$

The following describes the voice packet queuing requirement. The rate that voice packets leave a transmission queue of a network node should be no slower than the arrival rate of voice packets. Otherwise the transmission queue for voice packets in a network node will be overloaded. For the AP, this requirement can be written as:

$$(N+Na)*Tl\_d \leq dT$$
or
$$Na \leq Na2;$$
where:
  $Na2 = dT / Tl\_d - N.$

A new CAC metric for use in defining the number of additional calls that can be supported is therefore defined as:

$$Na = \min(Na1, Na2);$$
where:
  $Na1 = dT*(1-Pb)/(Tl\_u+Tl\_d);$
  $Na2 = dT / Tl\_d - N.$
If Na>1, then a new call can be admitted.

The CAC metric Na is determined by real-time measurable metrics and is therefore very accurate. Since Na is self-adaptive, it can dynamically adjust to changes in network conditions. For example, when the data traffic increases, the number of allowed calls can be lowered automatically, Na also includes other network factors, such as traffic load, channel conditions, and multi-cell interference.

C. Example Process for Use in Call Admission Control

Figure 2:
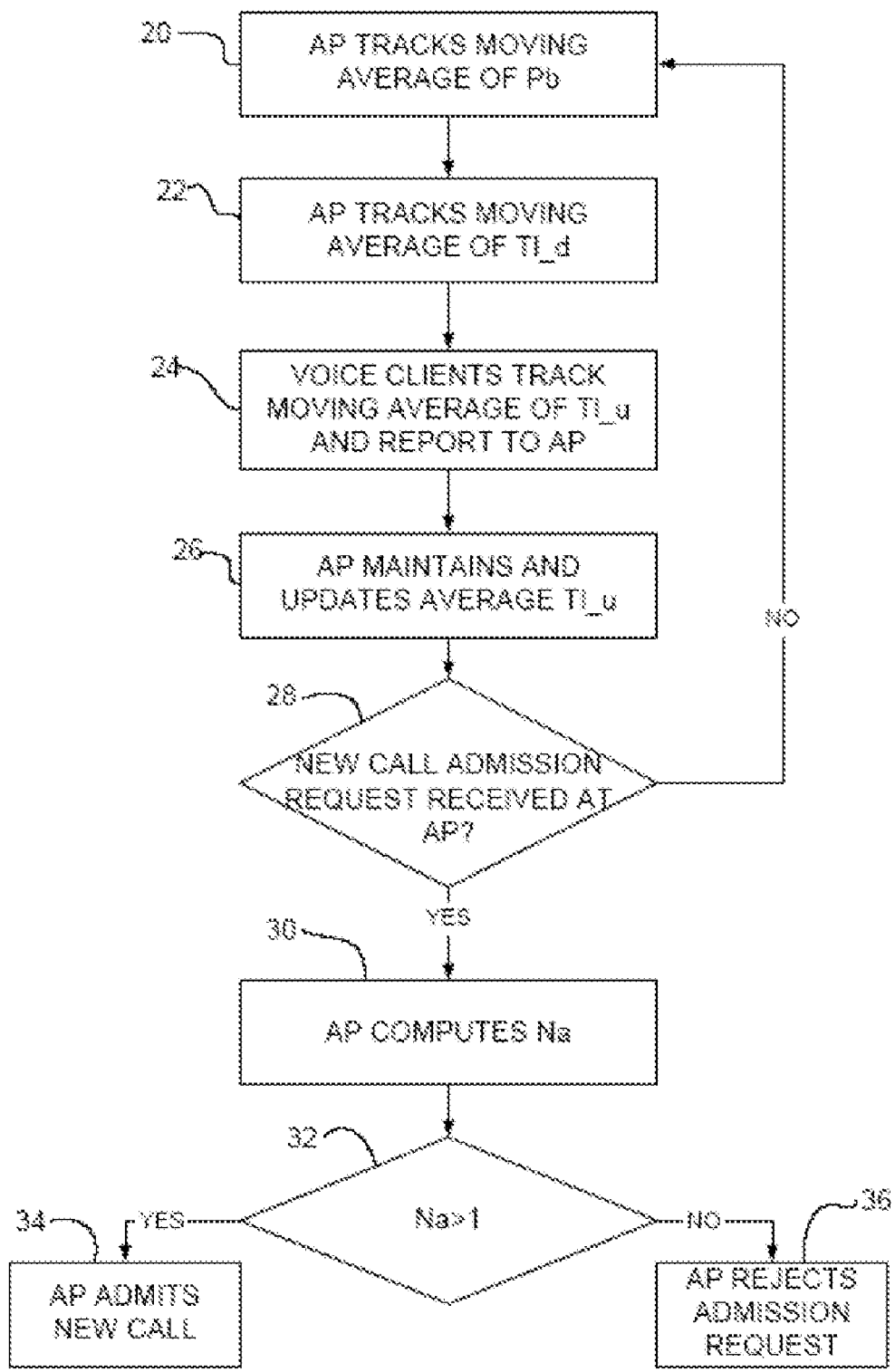
FIG. 2 illustrates an example method for evaluating the number of additional admissible calls for use in call admission control.

FIG. 2 illustrates an example method for evaluating the number of additional admissible calls for use in call admission control. At step 20, the AP keeps track of a moving average of Pb over a sliding time window. As described above, Pb is derived from the time the AP is in transmission and the time the AP's CCA reports busy. The AP also keeps track of a moving average of Tl_d over a sliding time window (step 22). Each voice client keeps track of a moving average of its Tl_u over a sliding time window and reports Tl_u to the AP periodically (step 24). The AP maintains an average of Tl_u over the number of received TL_u's within a sliding time window (step 26). Upon receiving a Tl_u from a voice client, the AP adjusts the average Tl_u it maintains accordingly. When the AP gets a new call admission request, it computes Na1, Na2 and Na from N, Pb, Tl_U and Tl_d by using the above formulas (steps 28 and 30). If Na is greater than 1, the AP can safely admit the new call (steps 32 and 34). If Na is less than or equal to 1, the AP rejects the admission request (steps 32 and 36).

It is to be understood that the process described above is only one; example, and that the process may be modified without departing from the scope of the invention. For example, the method can easily be extended so that some call slots are reserved for roaming calls. The process may also be applied to admission control for other QoS applications such as video streams. Also, other co-channel APs can exchange information so that the total N (number of calls on the channel) is accounted for in the formula for Na2. In another embodiment, other co-channel APs can exchange information so that only Pb due to voice calls (and not best-effort data packets) is measured, thereby providing a more accurate estimate of Na. This may be important since EDCA will, to a large extent, prioritize voice and video packets ahead of data packets. Also, the process may be extended to use different voice packet intervals other than 20 ms or even a mixture of intervals within a BSS.

D. Example Admission Control Module

Figure 3:
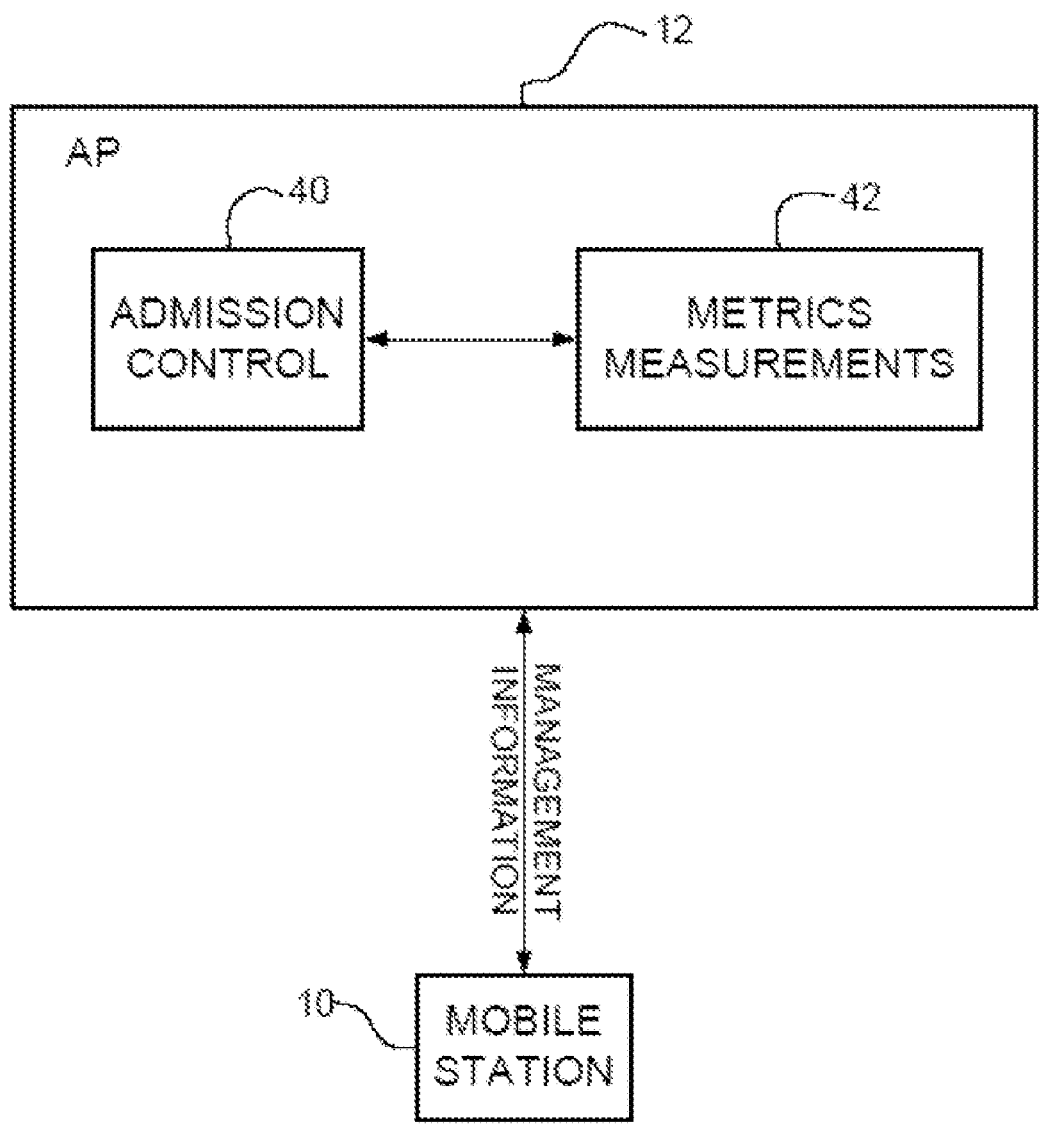
FIG. 3 illustrates example components of an access point of the wireless communication system of FIG. 1.

FIG. 3 illustrates example components of an access point of the wireless communication system of FIG. 1. In one implementation, a metrics measurement module 42 posts the latest measurement of metrics such as Tl_u, Tl_d, Pb, etc, (described above). The admission control module 40 computes Na from these values. In one implementation, the metrics measurement module 42 also posts the latest measurement of metrics such as Pb, Av, RRv, Qo, No, Nn, etc. (described below). Information from the mobile stations 10 is transferred to the AP 12 as management information. The admission control and metrics measurement modules 40, 42 are 20 shown in FIG. 2 as part of the AP 12. It is to be understood, however, that the admission control module 40 may also be located within the WDS 14. In this case, requests for voice metrics are sent to the APs 12 over the WDS 14. As the APs 12 receive the request for voice measurements, they respond to the WDS 14 with requested data.

The AP 12 (or WDS 14) collects the data and dynamically performs the calculations to determine the CAC metrics. If the AP 12 determines that the number of calls has reached its limit based on the CAC metrics, it rejects new requests and may direct the requests to other APs 12. The admission control module 40 may respond to a request with a bandwidth confirm message permitting a call to be placed or a bandwidth reject message refusing to make the necessary connection for the call.

Figure 4:
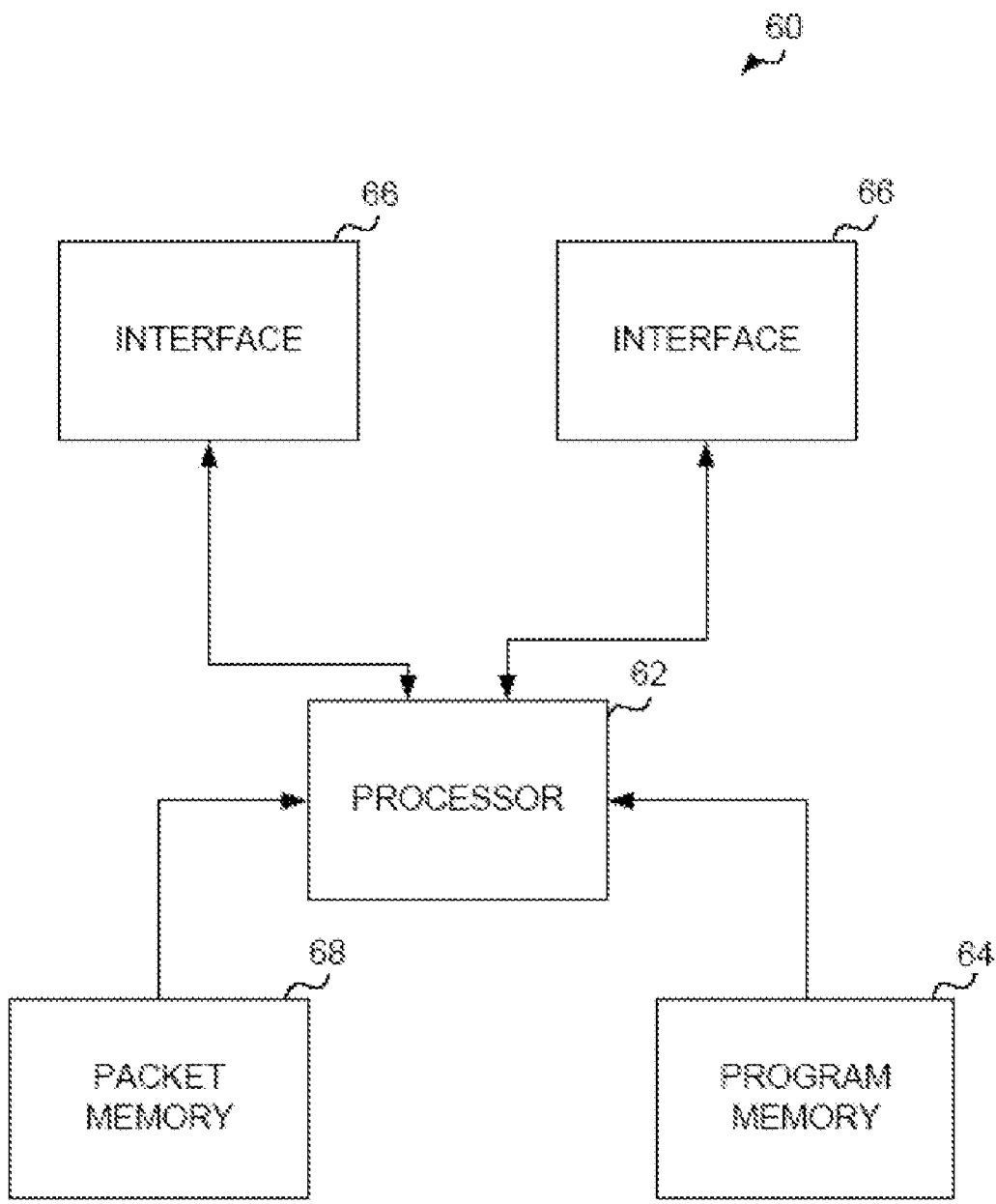
FIG. 4 illustrates an example network device.

The admission control module 40 may be a controller having a processor configured to execute software stored in memory and receive input from interfaces for use in executing the software, as described below with respect to FIG. 4, for example. FIG. 4 illustrates an example network device. In one embodiment, network device 60 is a programmable machine that may be implemented in hardware, software, or any combination thereof. A processor 62 executes code stored in a program memory 64. Program memory 64 is one example of a computer-readable medium. Program memory 64 can be a volatile memory. Another form of computer-readable medium storing the same codes is a type of non-volatile storage such as floppy disks, CD-ROMs, DVD-ROMs, hard disks, flash memory, etc. A carrier wave that carries the code across a network is another example of a computer-readable medium. Network device 60 may interface with transmission media via a plurality of interfaces 66. To implement functionality according to the present invention, interfaces 66 may incorporate processing and memory resources similar to those discussed above in connection with the network device as a whole. As packets are received, processed, and forwarded by network device 60, they may be stored in a packet memory 68. Network device 60 shown in FIG. 4 is only one example of a computer system suitable for use with the invention. Other devices and systems having different configurations of subsystems may also be utilized.

As can be observed from the foregoing, the system and method described herein have many advantages. For example, the number of admissible calls (Na) is determined by real-time measurable metrics of the network, so it is very precise for the real time network conditions, Na is also self-adaptive and, therefore, can dynamically adjust to changes in network conditions. For example, when the data traffic decreases, the number of allowed calls can be increased automatically. Furthermore, Na automatically includes other network factors, such as traffic loads, channel conditions, and multi-cell interference via the percentage of channel business and retransmissions and back-off counted in transmission time. It also accounts for local channel conditions including foreign interference that may only affect one or more APs and not the entire WLAN, Since Na is a function of N, Na has a good predictability demanded by any reliable CAC procedure.

While the implementations described above involve both uplink and downlink measurements, the implementations described below may operate without the uplink measurements. Furthermore, the implementations described below also contemplate the coexistence of voice clients with various codecs and accommodate voice channel reservation and roaming reservation.

E. Example Enhanced Process for Use in Call Admission Control

The following description describes implementations where the wireless network infrastructure determines whether a call admission request for a new call or for a roaming call should be admitted based on the medium time, the packet rate, or a combination thereof. In the implementation described below, the call admission decisions are based on metrics observed by access points, obviating the need for metrics observed by mobile stations. The call admission control functions discussed below also account for voice channel reservations and roaming-in reservations which a network administrator may have configured. The wireless communication network of FIG. 1, the admission control module 40 and metrics measurements module 42 of FIG. 3, and the network device 60 of FIG. 4, described above, may be used to implement the embodiments described below.

Figure 5:
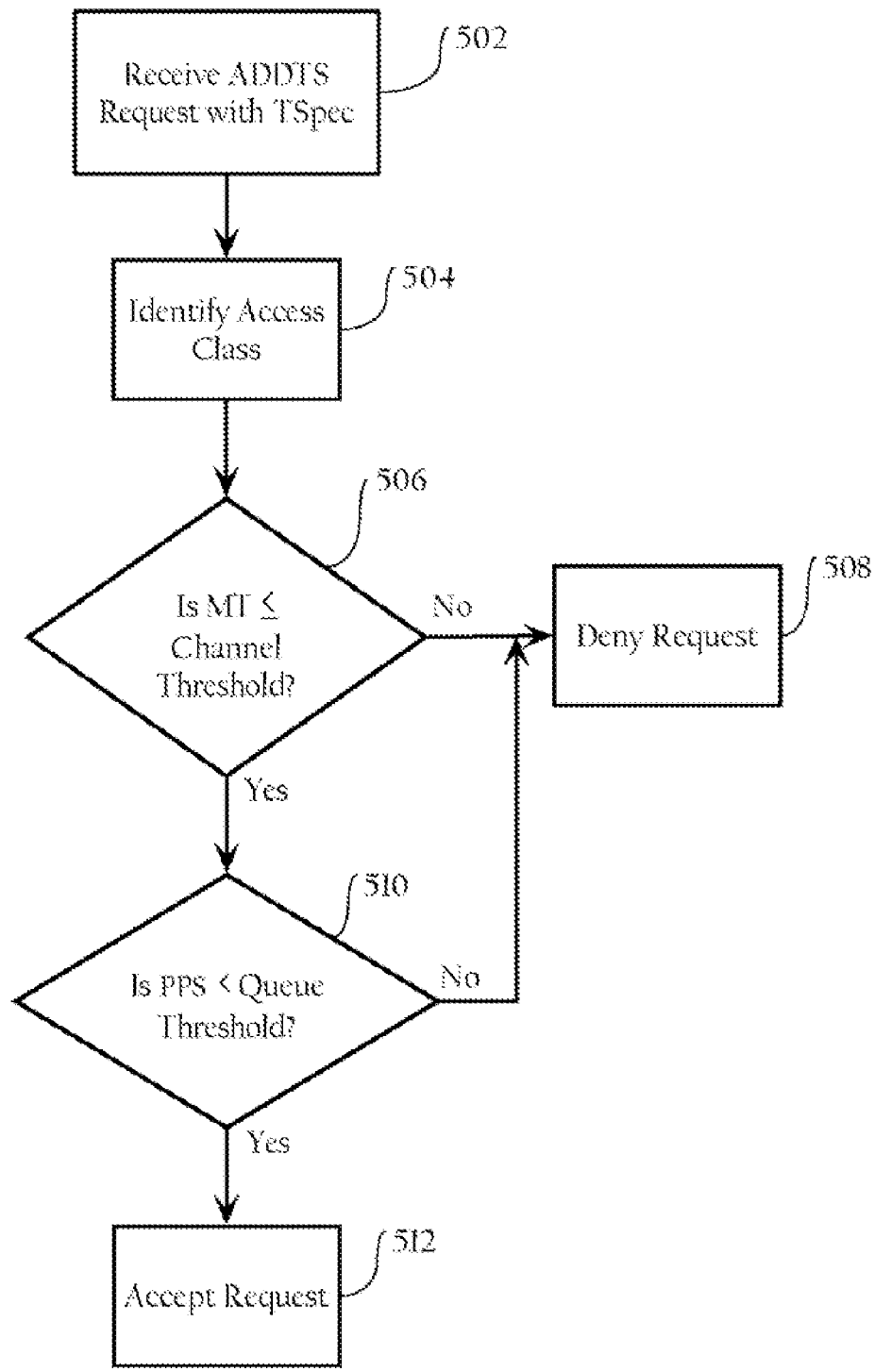
FIG. 5 illustrates an example method for call admission control.

FIG. 5 illustrates an example method for call admission control. As FIG. 5 shows, an AP 12 receives a call admission request (or re-association request) from a mobile station 10 (502). Next, AP 12 identifies the access class of mobile station 10 (504). Next, AP 12 determines if the medium time is less than or equal to a channel threshold (506). The comparison of the medium time to the channel threshold is described in more detail below in Section F.1. If the medium time is greater than the channel threshold, AP 12 denies the request (508). If the medium, time is less than or equal to the channel threshold, AP 12 determines if the packet rate is less than a queue threshold (510). The comparison of the packet rate to the queue threshold is described in more detail below in Section F.2. If the packet, rate is not less than the queue threshold, AP 12 denies the request (508). If the packet rate is less than the queue threshold, AP 12 accepts the request (512).

E.1. Comparison of the Medium Time to the Channel Threshold

In one implementation, the medium time (MT) is a value that represents a portion of the available medium that the admission control module 40 will allocate to a mobile station 10 for transmission. In one implementation, MT is based on the QoS parameters requested by a mobile station. In one implementation, MT may be expressed in a number of uniform time intervals within a given period in which admission control module 40 will allow mobile station 10 to use the medium. For example, in one implementation, the uniform time interval may be 32 μs and the time period may be one-second. Accordingly, if admission control module 40 provides mobile station 10 with an MT of 1000, mobile station 10 will have permission to use the medium for 1000 32 μs increments per 1-second period.

Admission control module 40 computes MT for a new call admission request, which, in one implementation, may be a non-roaming in call or a roaming in call. In one implementation, the call admission request may be an ADDTS request. According to the 802.11e specification, the ADDTS request is a management frame that includes a Transmission Specification information element (TSpec IE) that can be used to specify a requested set of QoS attributes, such as data rate, packet size, packetization interval, and priority. In one implementation, the stream for which QoS is requested is identified by a Traffic Stream Identifier (TSID) contained in the TSpec IE. In one implementation, mobile station 10 provides TSpec parameters via the TSpec IE to admission control module 40, which in turn computes MT based at least in part on the parameters.

In one implementation, AP 12 compares the MT to the channel threshold according to the following equation:

$$MT <= min(1-Pb, Av-RRv-Pv).$$

The equation 1−Pb is the percentage idle time of the medium, where Pb is the percentage of time that the medium is busy (e.g., busy demodulating IEEE standard 802.11 traffic) and includes the time during which the AP 12 transmits packets and the time during which the clear channel assessment (CCA) report of AP 12 indicates that the channel is busy, such as during the time when the RSSI is greater than CCA. In one implementation, an optimization may be to add DIPS and CWmin/2 for packets transmitted by AP 12.

Av is the percentage of the medium/channel allocated for voice calls. In one implementation), Av may function as an upper limit, thereby providing sufficient bandwidth for voice channel reserves or other purposes. In one implementation, if excessive interference is present in the WLAN, admission control module 40 may limit the voice capacity to a value lower than Av. In one implementation, a user (e.g., a system administrator) may configure a maximum bandwidth utilization per queue and a roaming reserve per queue. For example, the user may configure admission control module 40 to allocate a portion of the channel bandwidth (e.g., up to 50%) to voice sendees.

RRv is the percentage of channel allocated for roaming reserves for voice calls. In one Implementation, AP 12 may derive RRv based on the voice call allocation. Alternatively, in one implementation, the user may manually configure an RRv value. For example, the user may input an RRv value to configure admission control module 40 to allocate a portion of the channel bandwidth (e.g., up to 50%) for roaming reserves for voice. In one implementation, the RRv term is used for non-roaming-in calls. For roaming-in calls, the RRv term is eliminated from the computation above.

Pv is the observed utilization of the channel or medium by admitted voice calls over the last 1-second time period. In one implementation, Pv may be described by the following equation:

$$Pv = \Sigma(Tdr) + 1.1 * \Sigma (Tu\_vc), \text{ where}$$
$$Tdr = \Sigma(Tvtx + DIFS + slot*CWmin/2 + SIFS + Tack), \text{ and}$$
$$Tu\_vc = \Sigma(Tvoice + DIFS + slot*CWmin/2 + SIFS + Tack).$$

Tvtx is the transmission time of voice frames from the AP. Σ is the sum over all voice packets that AP 12 transmits, including retries. The term slot refers to the radio-dependent slot time, Tvoice is the receiving time of voice frames to the AP while the sum is over all voice packets that are correctly demodulated. In one implementation, upstream measurements may include downstream transmissions from other APs. This equation for Tdr accounts for the time corresponding to successful transmissions as well as transmissions whose data frame is successfully demodulated but whose ACK is lost. Tack is the time to transmit an acknowledgement.

In one implementation, all metrics in Pv are computed in one-second intervals. Computing Pv in one-second intervals eliminates any explicit codec dependencies. Eliminating codec dependencies enables multiple codes to coexist, thereby enabling a mixture of codec intervals (e.g., both 20 ms and 30 ms packetization intervals).

As described above, if MT is greater than the channel threshold, AP 12 denies the request (508), and if the medium time is less than or equal to the channel threshold, AP 12 determines if the packet rate is less than a queue threshold (510), as described below.

In one implementation, Pv may involve default or assumed uplink values in terms of actual, measured downlink values, thereby providing a solid approximation based on extensive network simulations that utilize measurements of APs even when measurements of mobile stations may not be available. Accordingly, Pv provides, in one implementation, a precise prediction of channel bandwidth consumption by eliminating potential inaccuracies resulting from any possible overlapping of uplink and downlink transmission delays observed in some situations.

In one implementation, admission control 40 computes MT in the same units that 802.11e and WMM TSpecs use. This is not only convenient but it is also service independent in that it may provide call admission decisions in terms of medium time.

Although the present invention disclosed herein is described in the context of voice packets, the present invention may apply to packets of other access classes (e.g., video packets, etc.), and still remain within the spirit and scope of the present invention.

E.2. Comparison of the Packet Rate to the Queue Threshold

As described in more detail below, the packet rate is compared to a queue utilization threshold to ensure that the number of packets entering the queue is less than the number of packets leaving the queue. In one implementation, AP 12 compares the packet rate to the queue threshold according to the following equation:

$$QOU * \frac{No + Nn}{No} < 1.$$

The current/observed queue output utilization QOU is multiplied by (No+Nn)/No to determine if the estimated queue output utilization is less than 1 second or 100% of the queue capacity. In one implementation, QOU is calculated in packets per second (pps). The above threshold determination is based on a 1 second analysis interval; accordingly, the threshold value of 1 second will change depending on the analysis interval.

The sum of No and Nn is the new aggregate packet rate, or percentage increase, if the current call admission request is granted, where No is the total observed current packet rate (i.e., on-going calls without adding the new stream) and Nn is the estimated packet rate for the current call (i.e., of the new call/stream in question). In one implementation, No and Nn represent downlink voice packets (i.e., packets being transmit down from AP 12 to mobile station 10). Nn may be derived from one or more attributes of the call admission request (such as a codec identifier or a packetization interval), and the observed packet rate over the last one-second interval.

In one implementation, QOU may be described according to the following equation:

$QOU = \Sigma Td + \Sigma Tw$, over the last 1-second interval.

Td is the medium/transmission time corresponding to downlink voice frames, which includes retries and, in one implementation, may be described according to the following equation:

$Td = \Sigma(Tvtx + SIFS + Tack)$, over the last 1-second interval.

Tw is the time that voice packets spend waiting at the front of the queue before transmission begins.

Although the present invention disclosed herein is described in the context of one queue for QoS packets, the present invention may apply to multiple queues and each queue may be dedicated to a different access category (e.g., one for voice, one for video, etc.), and still remain within the spirit and scope of the present invention.

In one implementation, admission control module 40 may adapt the processes described above in order to compute a particular number of additional calls that may be admitted. For example, admission control module 40 may utilize the following equation to compute a particular number of additional calls:

---

Na = min(Na3, Na4), where
Na3 = N*min(1−Pb, Av − RRv−Pv)/Pb_v, and where
Na4 = No/Nn*(1/Q0 − 1).

---

N is the number of calls admitted by AP 12 (which does not include calls admitted by other co-channel APs). Pb_v=(2+ 3Rd)/(1+Rd)*sum(Td), and Rd is the average retry rate for downlink voice packets.

In one implementation, CAC functions, as discussed above, may independently apply to individual queues (e.g., AC_VO and AC_VI). For example, admission control 40 may allocate separate bandwidth for voice services (using AC_VO) and video conferencing and/or video streaming services (using AC_VI). In one implementation, admission control module 40 may dynamically admit new traffic streams and enforce per-queue bandwidth, thereby providing much flexibility. Furthermore, in one implementation, packetization intervals may be different among queues.

F. Call Admission Control Finite State Machine

Figure 6:
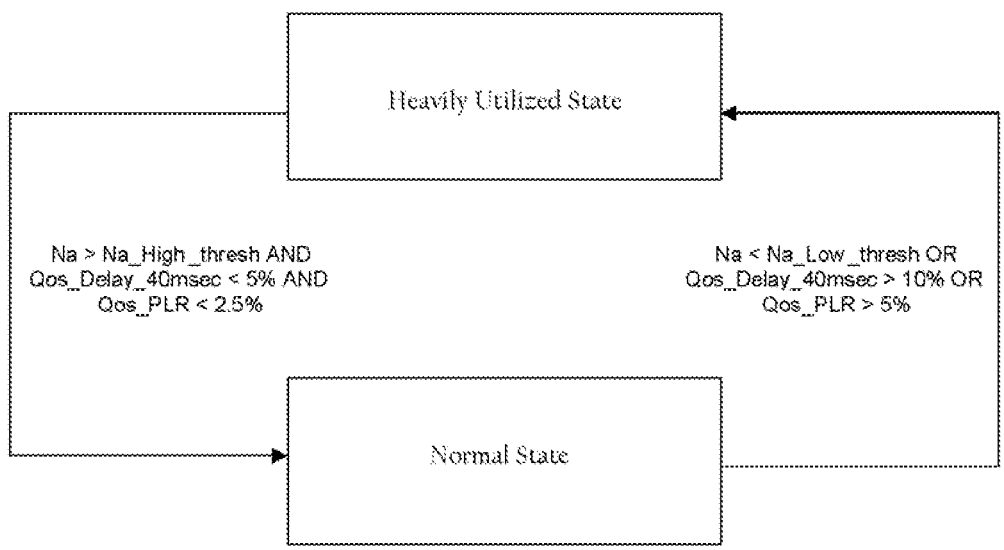
FIG. 6 illustrates an example call, admission control finite state machine.

FIG. 6 illustrates an example call admission control (CAC) finite state machine. As FIG. 6 shows, the finite state machine has at least two states: a normal state and a highly utilized state. In one implementation, the normal state may be for light usage. An example of light usage may be where the channel is idle the majority of the time. During this state, the wireless network infrastructure may apply a load-based CAC algorithm, as described above in the preceding sections. Alternatively, the wireless network infrastructure may apply any appropriate CAC algorithm such as a fixed CAC algorithm, which is based on the number of requests. In one implementation, the heavily utilized state may be used for heavy usage. An example of heavy usage may be where the channel may be busy or the channel may be in a condition that is not ideal for admitting many new calls.

The finite state machine may switch between the two states depending on whether the channel is experiencing light or heavy usage. In one implementation, the finite state machine may utilize CAC metrics to make this determination and to determine whether to make a state transition. As described in more detail below, in one implementation, such CAC metrics may include packet latency, packet loss rate, and/or usage thresholds.

In one implementation, policies may be implemented to determine whether and how to adjust call admission decisions. For example, in one implementation, if the channel is in the normal state, a CAC algorithm may admit both new calls and roaming-in calls. As described in more detail below, the channel may be in the normal state if criteria, which are associated with at least one of the packet latency or packet loss rate metrics, are met. In one implementation, if the channel is in the heavily utilized state, the CAC algorithm may not admit any new calls but may admit a roaming-in call if the criteria associated with all or a predefined set of the packet latency, packet loss rate, and usage thresholds are met. In one implementation, the finite state machine may comprise a third state. The third state may be an impacted state, for example, where the CAC algorithm does not admit any new calls or roam-in calls.

F.1. Packet Latency and Packet Loss Rate

In one implementation, the packet latency may be the percentage of packets that experience a predefined QoS delay (e.g., 40 msec or more) (QoS_Delay_40 msec) in the media access control (MAC) queues. In one implementation, the packet loss rate may be a QoS packet loss rate (QoS_PLR), which may be the percentage of QoS packets that get dropped. For example, a given packet may get dropped if it stays in the queue too long or if the number limit of retransmission attempts is reached, etc. As described, above, during the normal state, the wireless network infrastructure may apply a load-based CAC.

F.2. Load-Based Call Admission Control

As discussed above, packet latency and packet loss rate metrics may be may used in a load-based CAC algorithm. In one implementation, the load-based CAC measures RF channel conditions and then may use these measurements in admit/deny decisions for a particular bandwidth request. In one implementation, the wireless network infrastructure may take into account interference in the channel. Interference may come from other co-channel, wireless access points or it may be foreign interference (i.e., non-802.11 transmissions such as microwave ovens). This is useful information as interference effectively "uses" the medium time that would otherwise be available for transmissions. Note that these measurements may be made by a wireless access point or by wireless clients associated to the wireless access point. If the measurements are made by wireless clients, the measurements may be communicated to the wireless access point on a regular basis for use in load-based-CAC. The wireless clients making these measurements do not necessarily include the wireless client which is requesting bandwidth.

There may be some situations, however, where load-based CAC cannot optimally measure utilization of the channel by frames transmitted with voice priority. In unlicensed bands, for example, there may be some unforeseen factors that the estimates of number of added calls Na may not completely take into account. Some of these may include the interference with 802.11b/g stations built by other vendors which do not accommodate the prerequisites for our load-based CAC, microwave oven interference, wireless phone interference, and interference with non-802.11 compliant radios.

Furthermore, in some implementations of admission control, a system administrator may be given the capability to allocate a certain percentage of the channel for use by a particular sendee. For example, a system administrator may want to allow voice services to use only up to 60% of the channel so that the remaining 40% may be used by mission critical data and WLAN management purposes. In these cases, load-based CAC measure channel usage on a service basis. In the wireless network infrastructure, layer 2 sendee may be defined as a service for a specific user priority. For example, applications may make use of 8 different priorities, with values 0 through 7, inclusive, when transmitting their frames onto the wireless medium. Both 802.11e and WMM have defined 4 transmit queues with two user priorities mapping into each transmit queue. For example, user priorities 6 and 7 may map to AC_VO (the voice queue). Each queue may be given prioritized access to the medium by assigning that queue to use varied EDCA parameters (CWmin, CWmax, and AIFS). The higher the queue priority, the more quickly its Enhanced Distributed Channel Access (EDCA) parameters allow it to access the medium.

In these situations, implementations of load-based CAC may make measurements of usage on a user-priority basis. To do this, the wireless access point observes the user priority in the QoS control portion of the MAC header and adds up the medium time usage on a user-priority basis.

There may be cases where it may be difficult to determine the user priority to which a given transmitted frame belongs. For example, in one case, when the frame is received in error by the wireless access point, it cannot, assign the medium time usage by erroneous frames to a particular user-priority. Another case is where legacy clients are using the medium; legacy clients do not add the QoS control field to the MAC headers for the frames they transmit, so the wireless access point cannot assign the medium time consumed by these frames to a particular user priority. The third case is where the client (either a legacy client or a client having an 802.11e/WMM association) uses EDCA parameters for a different queue than it is supposed to for the frame being transmitted. Another case may be where malicious users attempt to get preferential access to the medium.

To address these exceptional conditions, the following usage threshold metrics augment the load-based CAC in order to ensure that users maintain the QoS needed for their various applications.

F.3. Usage Threshold Metrics

In one implementation, one CAC metric used in calculating state transitions and used in making call admission decisions is the estimated number of admissible calls (Na). In one implementation, a finite state machine exists in each wireless access point, and each wireless access point calculates the number of admissible calls Na at regular intervals. As described in more detail below, the number of added calls Na may be used to determine maximum and minimum usage threshold metrics, which may be used to determine for state transitions.

In one implementation, one usage threshold value (Na_Low_Thresh) may represent the parameters and conditions that control state transition from the normal state to the heavily utilized state. In one implementation, a second usage threshold value (Na_High_Thresh) may represent the parameters and conditions that control the transition from the heavily utilized state to the normal state.

In one implementation, the usage threshold values Na_Low_Thresh and Na_High_Thresh may be derived from user configuration parameters. In one implementation, the usage threshold values may be derived from the percentage of the channel allocated for voice sendees (Av) and the roaming reserve (RRv), both of which may be user-configurable parameters. In one implementation, the actual equations may be refined as needed. In one implementation, the threshold values may be based on the following equations:

Na_High_Thresh = (Av/100 * (MaxCallCapacity − 4));
Na_Low_Thresh = Na_High_thresh/3 + num_of_calls(RRv); and
Na_Roam_Thresh = num_of_calls(RRv)/2.

In one implementation, Av is the percentage of the medium/channel allocated for voice calls, MaxCallCapacity may be computed based on the average MT value of calls (or a default MT value), RRv is a percentage of channels allocated for roaming reserves for voice calls.

In one implementation, any one or combination of CAC metrics may be satisfied in order to trigger a transition from one state to another. In one implementation, the conditions for transitioning from one state to another may be significantly tighter than the reverse. For example, referring to FIG. 6, in one implementation, the wireless network infrastructure may transition from the highly utilized state to the normal state if the QoS delay is less than a predefined percentage (e.g., 5%), and the QoS_PLR is less than a predefined percentage (e.g., 2.5%), and the number of admissible calls, Na, is greater than the high threshold Na_High_Thresh. In one implementation, the wireless network infrastructure may transition from the normal state to the highly utilized state, if the QoS delay is greater than a predefined percentage (e.g., 10%), or the QoS_PLR is greater than 5, or the number of added calls Na is less than the low threshold Na_Low_Thresh.

In one implementation, in either the normal or highly utilized state, the wireless network infrastructure may perform an override check prior to admitting or rejecting a call. The wireless network infrastructure may also compare the current call count Na against Nmax or Nmin values. For example, when the load-based CAC is in the heavily utilized state, it may admit Nmin number of calls.

As described below, during the highly utilized state, the wireless network infrastructure may apply a more stringent call admission algorithm.

In one implementation, during the highly utilized state, the CAC algorithm may implement high-usage policies to determine whether and how to adjust call admission decisions. For example, in one implementation, the CAC algorithm may not admit any new calls but may admit, a roaming-in call if the criteria associated with all or a predefined set of the packet latency, packet loss rate, and usage thresholds, described above, are met.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited, except as indicated by the appended claims.

What is claimed is:

1. One or more non-transitory computer-readable storage media embodying software operable when executed by one or more computer systems to:

receive a call admission request from a wireless client seeking medium access to a wireless network;

in a first state, apply a first call admission control (CAC) algorithm to the call admission request;

in a second state, apply a second CAC algorithm to the call admission request; and transition between the first state and the second state based on one or more of the following equations:

$$Na\_High\_Thresh = (Av/100 * (MaxCallCapacity - X));$$
$$Na\_Low\_Thresh = Na\_High\_thresh/Y + num\ of\ calls(RRv);\ and$$
$$Na\_Roam\_Thresh = num\ of\ calls(RRv)/Z,$$

wherein Na is the number of additional calls, wherein Av is the percentage of the channel allocated for voice calls, wherein MaxCallCapacity is based on the average MT (Medium Time) value of calls, wherein RRv is a percentage of channel allocated for roaming reserves for voice calls, wherein X is a user-configurable value, and wherein Y and Z are each a non-zero user-configurable value.

2. The media of claim 1 wherein the first state is a normal state and the second state is a heavily utilized state.

3. The media of claim 1 wherein the at least one attribute comprises a packet latency.

4. The media of claim 1 wherein the at least one attribute comprises a packet loss rate.

5. The media of claim 1 wherein: transition from the first state to the second state is based on a first usage threshold; and transition from the second state to the first state is based on a second usage threshold.

6. One or more non-transitory computer readable storage media embodying software operable when executed by one or more computer systems to:

receive a call admission request;

in a first state, apply a first call admission control (CAC) algorithm to the call admission request;

in a second state, apply a second CAC algorithm to the call admission request; and transition between the first state and the second state based on one or more of the following equations:

$$Na\_High\_Thresh = (Av/100 * (MaxCallCapacity - 4));$$
$$Na\_Low\_Thresh = Na\_High\ thresh/3 + num\_of\_calls(RRv);\ and$$
$$Na\_Roam\_Thresh = num\_of\_calls(RRv)/2,$$

wherein Na is the number of additional calls, wherein Av is the percentage of the channel allocated for voice calls, wherein MaxCallCapacity is based on the average MT (Medium Time) value of calls, and wherein MT is a percentage of channel allocated for roaming reserves for voice calls.

7. The media of claim 1 wherein the first CAC algorithm is load based.

8. The media of claim 1 wherein the first CAC algorithm is fixed.

9. The media of claim 1 wherein in the first state, the first CAC algorithm admits both new calls and roaming-in calls.

10. The media of claim 1 wherein in the first state, the CAC algorithm admits new calls on a per-queue basis, and wherein each queue can be dedicated to a different access class.

11. The media of claim 1 wherein in the first state, the CAC algorithm admits a given call if a computed allocation is less than an amount of the access medium available to the access class identified in a Quality of Service request.

12. The media of claim 1 wherein in the second state, the second CAC algorithm does not admit any new calls but admits a roaming-in call if predefined criteria are met.

13. A method comprising:

receiving a call admission request from a wireless client seeking medium access to a wireless network;

in a first state, apply a first call admission control (CAC) algorithm to the call admission request;

in a second state, apply a second CAC algorithm to the call admission request; and transitioning between the first state and the second state based on one or more of the following equations:

$$Na\_High\_Thresh = (Av/100 * (MaxCallCapacity - X));$$
$$Na\_Low\_Thresh = Na\_High\ thresh/Y + num\ of\ calls(RRv);\ and$$
$$Na\_Roam\_Thresh = num\ of\ calls(RRv)/Z,$$

wherein Na is the number of additional calls, wherein Av is the percentage of the channel allocated for voice calls, wherein MaxCallCapacity is based on the average MT (Medium Time) value of calls, wherein RRv is a percentage of channel allocated for roaming reserves for voice calls, wherein X is a user-configurable value, and wherein Y and Z are each a non-zero user-configurable value.

14. The method of claim 13 wherein the first state is a normal state and the second state is a heavily utilized state.

15. The method of claim 13 wherein the at least one attribute comprises a packet latency.

16. The method of claim 13 wherein the at least one attribute comprises a packet loss rate.

17. The method of claim 13 wherein:

transitioning from the first state to the second state is based on a first usage threshold; and transitioning from the second state to the first state is based on a second usage threshold.

18. A method comprising:

receiving a call admission request;

in a first state, applying a first call admission control (CAC) algorithm to the call admission request;

in a second state, applying a second CAC algorithm to the call admission request; and transitioning between the first state and the second state based on one or more of the following equations:

$$Na\_High\_Thresh = (Av/100 * (MaxCallCapacity - 4));$$
$$Na\_Low\_Thresh = Na\_High\ thresh/3 + num\_of\_calls(RRv);\ and$$
$$Na\_Roam\_Thresh = num\_of\_calls(RRv)/2,$$

wherein Na is the number of additional calls,
wherein Av is the percentage of the channel allocated for voice calls,
wherein MaxCallCapacity is based on the average MT (Medium Time) value of calls, and
wherein RRv is a percentage of channel allocated for roaming reserves for voice calls.

19. The method of claim 13 wherein the first CAC algorithm is load based.

20. The method of claim 13 wherein the first CAC algorithm is fixed.

21. The method of claim 13 wherein in the first state, the first CAC algorithm admits both new calls and roaming-in calls.

22. The method of claim 13 wherein in the first state, the CAC algorithm admits new calls on a per-queue basis, and wherein each queue can be dedicated to a different access class.

23. The method of claim 13 wherein in the first state, the CAC algorithm admits a given call if a computed allocation is less than an amount of the access medium available to the access class identified in a Quality of Service request.

24. The method of claim 13 wherein in the second state, the second CAC algorithm does not admit any new calls but admits a roaming-in call if predefined criteria are met.

25. A system comprising:
a wireless network infrastructure node operable to receive a call admission request from a wireless client seeking medium access to a wireless network; in a first state, apply a first call admission control (CAC) algorithm to the call admission request; in a second state, apply a second CAC algorithm to the call admission request; and transition between the first state and the second state based on at least one or more of the following equations:

$$Na\_High\_Thresh = (Av/100 * (MaxCallCapacity - X));$$
$$Na\_Low\_Thresh = Na\_High\ thresh/Y + num\ of\ calls(RRv);\ and$$
$$Na\_Roam\_Thresh = num\ of\ calls(RRv)/Z,$$

wherein Na is the number of additional calls,
wherein Av is the percentage of the channel allocated for voice calls,
wherein MaxCallCapacity is based on the average MT (Medium Time) value of calls,
wherein RRv is a percentage of channel allocated for roaming reserves for voice calls,
wherein X is a user-configurable value, and
wherein Y and Z are each a non-zero user-configurable value; and
a wireless access point operable to receive the call admission request.

26. The system of claim 25 wherein the first state is a normal state and the second state is a heavily utilized state.

27. The system of claim 25 wherein the at least one attribute comprises a packet latency.

28. The system of claim 25 wherein the at least one attribute comprises a packet loss rate.

29. The system of claim 25 wherein: with the wireless network infrastructure node, transition from the first state to the second state is based on a first usage threshold; and
transition from the second state to the first state is based on a second usage threshold.

30. A system comprising:
a wireless network infrastructure node operable to:
receive a call admission request;
in a first state, apply a first call admission control (CAC) algorithm to the call admission request;
in a second state, apply a second CAC algorithm to the call admission request; and
transition between the first state and the second state based on one or more of the following equations:

$$Na\_High\_Thresh = (Av/100 * (MaxCallCapacity - 4));$$
$$Na\_Low\_Thresh = Na\_High\ thresh/3 + num\_of\_calls(RRv);\ and$$
$$Na\_Roam\_Thresh = num\_of\_calls(RRv)/2,$$

wherein Na is the number of additional calls,
wherein Av is the percentage of the channel allocated for voice calls,
wherein MaxCallCapacity is based on the average MT (Medium Time) value of calls, and
wherein RRv is a percentage of channel allocated for roaming reserves for voice calls; and
a wireless access point operable to receive a call admission request.

* * * * *